United States Patent
Stiffler

(10) Patent No.: US 7,515,998 B1
(45) Date of Patent: Apr. 7, 2009

(54) INFORMATION LAYER FOR A VEHICULAR CONTROL NETWORK AND METHOD

(75) Inventor: William T. Stiffler, Greenwood, IN (US)

(73) Assignee: Raytheon Company, Waltham, MA (US)

( * ) Notice: Subject to any disclaimer, the term of this patent is extended or adjusted under 35 U.S.C. 154(b) by 526 days.

(21) Appl. No.: 11/409,946

(22) Filed: Apr. 24, 2006

(51) Int. Cl.
  *G06F 7/00* (2006.01)
  *G05D 3/00* (2006.01)

(52) U.S. Cl. .......................... 701/3; 701/120; 244/75.1

(58) Field of Classification Search ............ 701/1, 701/3, 120; 244/75.1; 340/945
See application file for complete search history.

(56) References Cited

U.S. PATENT DOCUMENTS

| | | | | |
|---|---|---|---|---|
| 6,133,846 A * | 10/2000 | Birkedahl et al. | ............ | 370/225 |
| 6,377,860 B1 | 4/2002 | Gray et al. | ..................... | 700/83 |
| 6,665,594 B1 * | 12/2003 | Armstrong | ................... | 701/13 |
| 6,801,769 B1 | 10/2004 | Royalty | ...................... | 455/431 |
| 6,865,460 B2 | 3/2005 | Bray et al. | ..................... | 701/36 |
| 6,873,886 B1 | 3/2005 | Muller et al. | ................... | 701/2 |
| 6,985,478 B2 | 1/2006 | Pogossiants et al. | ........ | 370/352 |
| 7,415,331 B2 * | 8/2008 | Dapp et al. | .................... | 701/25 |
| 7,415,332 B2 * | 8/2008 | Ito et al. | ....................... | 701/29 |
| 7,418,317 B2 * | 8/2008 | Cosgrove et al. | ............... | 701/1 |

OTHER PUBLICATIONS

PCT International Search Report regarding Application No/Patent No. PCT/US04/35423 (7 pages).

* cited by examiner

*Primary Examiner*—Yonel Beaulieu
(74) *Attorney, Agent, or Firm*—Baker Botts L.L.P.

(57) ABSTRACT

A system and method to provide extensibility to an existing vehicular control network. To provide such extensibility, an information layer network incorporating a protocol such as an Ethernet protocol in which additional peripheral devices may be easily coupled thereto or additional software applications providing enhanced functionality. Interfacing of the information layer to the vehicular control network is accomplished via an Information layer interface mechanism that translates signals from those compliant to the vehicular control network to those compliant with the information layer. Additionally, means are disclosed to provide for momentary control over one or more peripheral devices that are coupled to the vehicular control network via peripheral devices that are coupled to the information layer.

20 Claims, 3 Drawing Sheets

INFORMATION LAYER FOR A VEHICULAR CONTROL NETWORK AND METHOD

TECHNICAL FIELD OF THE INVENTION

This invention relates to vehicular control systems, and more particularly, to a vehicular control network having an extensible information layer.

BACKGROUND OF THE INVENTION

The modernization of vehicular systems such as aircraft, automobiles, or marine vessels have included the implementation of guidance and control systems having a computerized control system. For vehicular systems such as aircraft having a military purpose, deployment and actuation of armament disposed thereon has migrated to computer control as well. In fact, newer technologies have been developed for the specific purpose of providing guidance, tactical, and/or strategic control over these aircraft. These newer technologies have resulted in a plurality of differing types of peripheral devices that may be configured on the aircraft for use by the pilot.

Given the data intensive nature of these systems, various networking protocols have been developed in order to move data efficiently from among the multiplicity of peripheral devices. One particular networking protocol that has gained wide acceptance for military applications is the MIL-STD-1553 "Aircraft Internal Time-Division Command/Response Multiplex Data Bus". The MIL-STD-1553 databus was originally deployed on military vehicles such as aircraft during the early 1970's, an era in which the computing capabilities of most peripheral devices was relatively crude by today's standard. Due to these inherent computing limitations, the MIL-STD-1553 was designed to encompass a highly command and control type architecture with very deterministic type inter-process signaling.

SUMMARY OF THE INVENTION

According to one embodiment of the invention, an information layer for a vehicular network includes a control network and an extensible layer that is coupled to the control network via an interfacing circuit. The control network is operable to administer the operation of at least one peripheral device associated with the operation of a vehicle via a vehicular control databus. The extensible layer is operable to administer the operation of at least one user interface application. The extensible layer has a protocol that is disparate to the control network. The interfacing circuit couples the control network to the extensible layer, thereby facilitating communication of the user interface application with the at least one peripheral device.

According to another embodiment of the present invention, a method of providing a first peripheral device that is coupled to the vehicular control databus and is not initially configured to transmit signals over the vehicular control databus may be momentarily configured to do so by substituting at least one a plurality of minor frames during operation of the vehicular control databus with at least one substituted minor frame such that the first peripheral device may transmit signals over the vehicular control databus via the at least one substituted minor frame. A vehicular control databus such as the commonly used MIL-STD-1553 protocol generally comprises major frames of fixed duration that are sub-divided into a plurality of minor frames. Although known as stable architecture, modification thereto following the development stage is relatively costly.

Some embodiments of the present invention may provide numerous technical advantages. A technical advantage of one embodiment may include the ability to add functionality to the vehicular control network in an easy and cost effective manner. Currently implemented vehicular control systems that utilize the MIL-STD-1553 databus are limited in that the addition of new hardware such as peripheral devices or modifications to software applications requires significant regression testing in order to ensure that the core functionality of the network has not been affected. One embodiment presents a solution to this problem by the addition of an information layer having a network protocol that is easily adaptable to new peripheral devices or software application modifications without undue obstruction of the operation of the existing control network and its associated peripheral devices. This embodiment may include a network protocol defined by an Ethernet protocol, for which many commercial-off-the-shelf peripheral devices have been developed therefor.

The Ethernet protocol may provide other advantages such as the ability to readily support other higher level networking structures such as the internet protocol (IP), and a descriptor language such as the extensible markup language (XML). Certain embodiments utilizing a plurality of software applications such as, for example, web-based services within the information layer may utilize a descriptor language to further facilitate the addition of new software applications into the system with minimal integration test time or regression testing.

Further advantages of particular embodiments may include the capability to adapt data that is presented to the pilot or operator of the vehicle. Because a pilot may be confronted with any number of situations during operation of the vehicle, a need exists for the pilot to have easy to access to data, that may be pertinent to that particular situation in a timely manner. Given the relatively tightly coupled, deterministic nature of conventional vehicular network structures such as the MIL-STD-1553 databus, access to pertinent data is inherently structured, and thus not easily accessed by the pilot. However, data available on an open networking structure such as the internet protocol provides the pilot with numerous differing means of obtaining pertinent data and therefore is easily accessible.

Another advantage that may be provided by certain embodiments of the present invention is the ability of the control network to administer the operation of peripheral devices disposed on the vehicle as well as other external peripheral devices that are not located on the vehicle. Thus the operator of the vehicle may access data configured within any network such as web-based services, wherein at least a portion of this data may exist in a database external to the vehicle. Moreover, this data may be accessible to the operator while the vehicle is in transit.

While specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description.

BRIEF DESCRIPTION OF THE DRAWINGS

A more complete understanding of embodiments of the invention will be apparent from the detailed description taken in conjunction with the accompanying drawings in which.

DETAILED DESCRIPTION OF EXAMPLE EMBODIMENTS OF THE INVENTION

Figure 1:
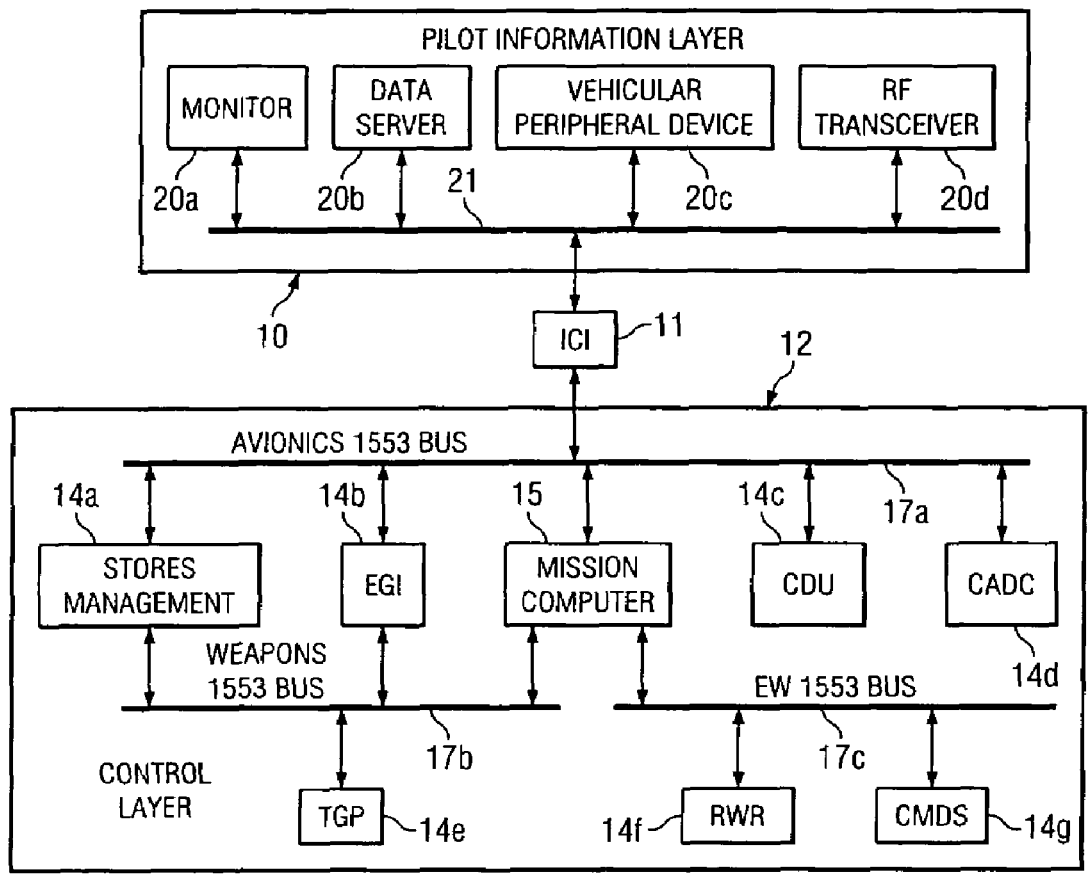
FIG. 1 is a diagrammatic view of an information layer that has been implemented on a vehicular control network, according to one embodiment of the present invention.

Shown in FIG. 1 is one embodiment of an implementation of an extensible information layer for a vehicular control network showing an extensible information layer 10, which is coupled to a control network 12 of a vehicle such as a military aircraft (not explicitly shown) via an information layer interface 11. The control network 12 generally comprises a plurality of peripheral devices 14a-g in communication with a mission computer 15. Peripheral devices 14a-g are generally designed to facilitate operation of the aircraft, provide sensory information to the pilot, and control various service devices disposed thereon. The peripheral devices 14a-g and mission computer 15 are coupled together by one or more vehicular control databuses (17a-c), which transfer data to and from one another via signals according to a desired protocol. An example of one type of desired protocol is a MIL-STD-1553 databus; however, any databus that is used to share data among a plurality of peripheral devices may be used with the teachings of the present invention.

Although the teachings of the present invention are described by example in association with a military aircraft, the vehicle with which the described components may be used may be any type of vehicle that is adapted for transport of an operator or pilot from one location to another. Examples of other types of vehicles may include other military vehicles such as tanks, armored personnel carriers, military marine vessels, or non-military vehicles such as commercial or personal airliners, automobiles, and the like. As well as other types of vehicles, it is anticipated that any one of the aforementioned types of vehicles could benefit from the teachings of the present invention.

In one embodiment, the information layer 10 comprises at least one user component 20 that may be a monitor 20a, such as a Cathode Ray Tube (CRT) or Liquid Crystal Display (LCD), a data server 20b, an information layer peripheral device 20c, and/or a radio frequency (RF) transceiver 20d. The radio frequency transceiver 20d allows the information layer to inter-network with other networks external to the vehicle, such as the world-wide-web (WWW) and their associated web-based services. Therefore, the information layer may be operable to access and/or control external peripheral devices, which are not disposed in the vehicle in addition to avionics peripheral devices, which are disposed on the vehicle. In one embodiment, one or more user components 20 may be coupled to one another via an information layer databus 21. The information layer databus 21 may be implemented using any suitable protocol; however, the information layer databus 21 of the present embodiment incorporates a protocol that provides for easy extensibility of additional user components and supports descriptor languages that provide easy commutation or intercommunication of software applications running thereon. In one embodiment, a databus incorporating an Ethernet protocol is used. The Ethernet protocol also provides a well established and stable platform to which many commercial-off-the-shelf components are readily adapted.

According to one embodiment, information layer 10 and control network 12 are disparate to each other. Throughout this specification, the term "disparate network" will be construed to mean a first network having a signaling protocol that is not compliant to that of a second network's protocol in the sense that the first and second network are incapable of transmitting or receiving meaningful messages between each other without the aid of an interface circuit. Communication between the information layer 10 and the control network 12 is accomplished by an information layer interface 11. The information layer interface 11 converts signals from the protocol of the vehicular control databus 21 to the protocol of the information layer databus 21 and vice-versa. One embodiment of the present invention provides an information layer interface 11 that is operable to convert signals transmitted over a MIL-STD-1553 databus into signals for transmission over an Ethernet databus. In another embodiment, the information layer interface 11 may operate on the MIL-STD-1553 databus as a bus monitor or as a remote terminal (described below) such that software applications residing on a user component may access data from the vehicular control databus 17 in a non-intrusive manner or may periodically provide predetermined control sequences to one of the plurality of peripheral devices 14.

The MIL-STD-1553 databus is a command/control type protocol in which peripheral devices 14 and their associated software applications configured thereon operate in a tightly coupled environment. Although this conventional type of architecture does provide advantages by ensuring a relatively high level of reliability and speed of operation, modifications or enhancements to these types of systems is relatively costly. This is principally due to the need for extensive regression testing to ensure that functionality critical to the core operation of the vehicle is not adversely affected—a limitation that an open architecture network such the Ethernet protocol does not have. Thus according to the teachings of the present invention, implementation of an information layer 10 in communication with the control network 12 provides enhanced utility by enabling additional functionality to the vehicle without necessitating the relatively long implementation time and excessive costs associated modifications directly to the control network.

As previously described, the control network 12 may contain one or more vehicular databuses 17 that are adapted to control and share data with a plurality of peripheral devices 14. Although not by way of limitation, these devices may include a stores management system 14a, an embedded global positioning system inertial navigation system (EGI) 14b, a mission computer 15 for facilitating and managing data transfers over the vehicular databuses, a control display unit 14c, a central air data computer 14d, TGP radar or targeting pod 14e, a radar warning receiver 14f, such as the Air Force's ALR-69 radar system, and counter measures, dispense system 14g.

The EGI 14b is a global positioning system (GPS) that provides instantaneous information regarding the current location of the vehicle. The central air data computer 14d measures static air data pressure, angle of attack, aircraft velocity, total pressure, altitude, and other ambient conditions pertinent to the operation of the vehicle. The radar warning receiver 14f inter alia provides radar imagery to the pilot. Nevertheless, the data outputted by the aforementioned devices may not be presentable to the pilot of the vehicle in an easily accessible form. Given the fact the pilot may encounter any number of a myriad of potential scenarios during operation of the vehicle, it is desirable to enable quick, easy access to all of the available data from peripheral devices 14 so that the pilot may take the most informed response to any given scenario. However, the tightly coupled nature of the control network tends to inhibit the free flow of information to the pilot. Thus, certain embodiments of the present invention provide a solution to this need by implementation of an information layer that allows access to data from peripheral devices 14 as well as other devices in a relatively quick, easy to access manner.

Figure 2:
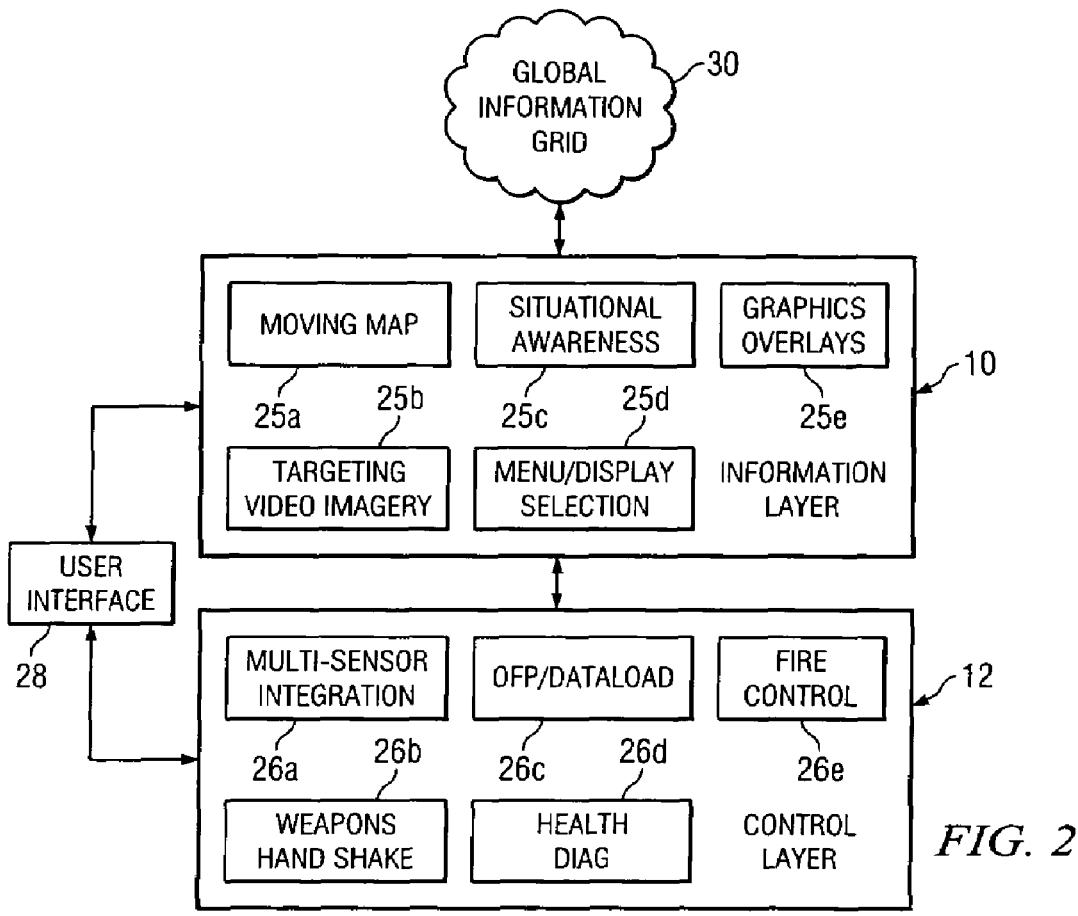
FIG. 2 is a diagrammatic view of several software applications that may be resident on the information layer and vehicular control network of FIG. 1.

FIG. 2 shows a diagrammatic view of a plurality of groups of software applications 25 and 26 embodying various functions within the information layer 10 and control network 12, respectively. As shown, the vehicular control network 12 contains functionality that is important to the core operation of the vehicle in which this functionality may include, but is not limited to, operational flight plan/dataload 26a for mission specific application coordination, multi-sensor integration 26b, weapons handshake 26c, fire control 26d, and health diagnostics 26e. Conversely, the information layer 10 may provide software applications embodying functionality that enables access to data from the vehicular control network 12 as well as from other sources such as a Global Information Grid 30 via the radio frequency transceiver 20d. The software applications 25 running on the information layer 10 provide functionality that may include, but are not limited to, moving maps 25a, targeting/video imagery 25b, user menu/display selection 25c, situational awareness 25d, and graphics overlays 25e. Software applications 25 may correlate data that is available within the system for the use of the operator. Given the extensible nature of the Ethernet protocol, the information layer 10 is also capable of accessing data from the global information grid 30. In some embodiments, the global information grid 30 may comprise an internal data network that may be proprietary in nature, a wide area network (WAN), metropolitan area network (MAN), an intranet, the Internet, or other suitable network. Additionally, software applications 25 within the information layer 10 may access data from the internally located data server 20b, which may be a relational database, that is coupled to the information layer databus 21.

One sample embodiment involves the global information grid 30 or data server, which may contain raster imagery of maps that may be combined with GPS data from the vehicular control network 12 for display to the user via the moving map 25a application. The combination of data from differing sources may be accomplished in one embodiment, by the commutation of multiple software applications 25a-e running on the information layer 10 using a descriptor language such as the extensible markup language (XML). Thus, using XML primitives, any one of the software applications 25 may access data from another software application in order to provide additional functionality for the operator of the vehicle.

Manipulation of available information may be provided "on demand" to the user via a user interface 28, in one embodiment. The user interface 28 may comprise the monitor 20a or other similar device that provides the operator with pertinent information. Additionally, the user interface 28 may also comprise any input mechanism, such as graphical actuatable overlays (not specifically shown), having buttons overlaid on the monitor 20a that causes the system to formulate an appropriate response by pressing on a pertinent portion of the display by the pilot. Optionally, interaction with software applications 25 by the pilot may be accomplished by switches or buttons conventionally available on a Hands on Throttle and Stick (HOTAS). The foregoing description provides only several examples of the many available methods of providing operator interaction with applications within the information layer.

Figure 3:
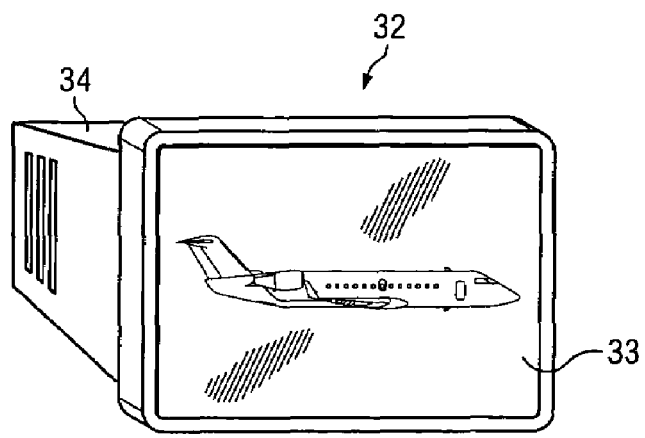
FIG. 3 is a simplified diagrammatic view of example components of a multi function display (MFD) that may be used in conjunction with the system of FIG. 1.
Figure 4:
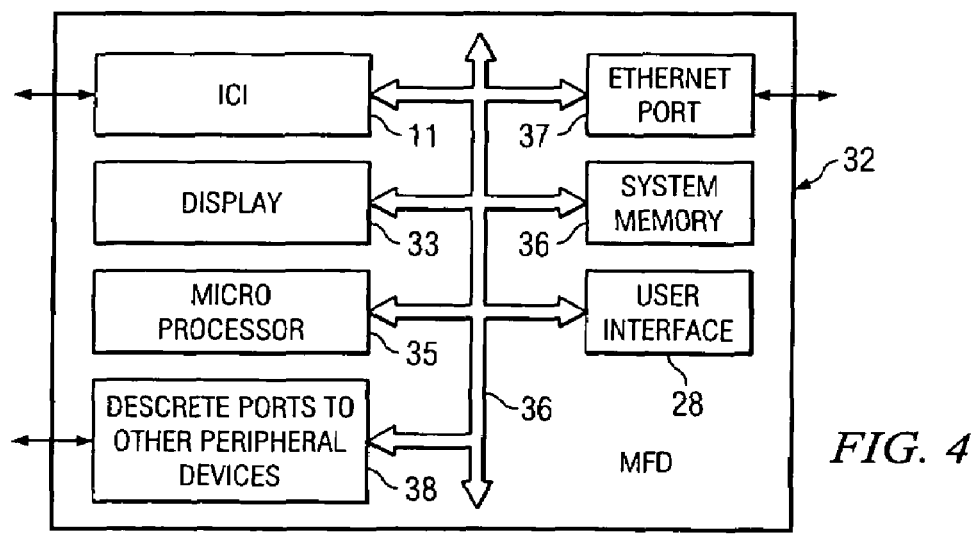
FIG. 4 is a photographic representation of the multi function display of FIG. 3.

Another embodiment of the present invention may provide a multi function display 32 comprising a visual display device in addition to other integrated functionality such as an onboard microprocessor controlled computing system and integrated information layer interface 11, as shown in FIGS. 3 and 4. A photographic representation of the multi function display 32 is shown in FIG. 3 having a front panel display 33. The front panel display 33 includes driving circuitry contained within an enclosure 34. A simplified diagram of the example components of the multi function display 32 are shown in FIG. 4. The example components generally comprise an onboard computer processor 35 that controls and administers all functions within the multi function display 32 via a system bus 36. Application software 25 residing within the multi function display 32 may be stored in system memory 36, which may comprise random access memory, read only memory, or may comprise other mass storage systems such as magnetic storage disks or optical storage disks. In one embodiment, the multi function display 32 also includes an information layer interface 11 for conversion of MIL-STD-1553 protocol to a native protocol, thereby further simplifying implementation of the present invention on an existing vehicle such as a military aircraft. Additionally, an Ethernet port 37 is also included for interconnection of the multi function display 32 to other Ethernet capable entities such as described hereinabove. The multi function display 32 may also comprise one or more other discrete ports 38 for dedicated connection to peripheral devices disposed on the vehicle.

Figure 5:
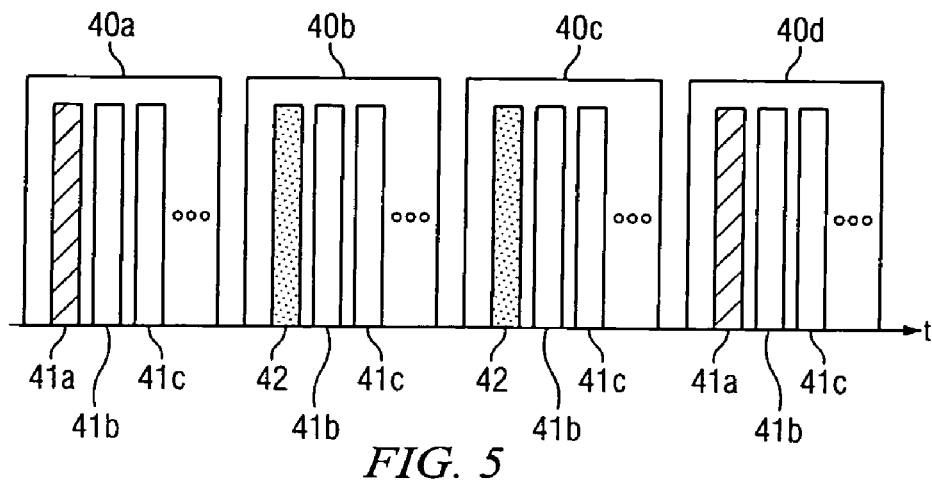
FIG. 5 is a graphic view of an example organization of major and minor frames that may be transmitted over a vehicular control databus such as a MIL-STD-1553 databus.

Another embodiment of the present invention presents an information layer that is able to communicate with the vehicular control network 12 using minor frame substitutions of one or more minor frames within a major frame of a logical protocol. Such a logical protocol that may be commonly used on vehicular control databuses such as a 1553 bus protocol is shown in FIG. 5. The logical protocol's structure generally comprises a major frame 40a-d having a fixed duration, which is repeatedly transmitted over the vehicular control databus 17. Contained within each major frame 40 are a plurality of minor frames 41a-c that are each allotted a predetermined portion of time or time slot within its respective major frame 40. Moreover, each of these minor frames 41 are adapted to convey one or more messages specific to a particular peripheral device coupled to the vehicular control databus 17. The architecture of such a protocol is such that the quantity of minor frames 41 as well as the sequence in which these minor frames 41 may access the vehicular control databus 17 is set during the development stage of the vehicular databus's design. Given the fact that most of these vehicular databus coupled peripheral devices may be used for control of the vehicle, the ability thereof to operate in "real time" is often desirable. Therefore, modification to this type of signaling protocol following completion of the development stage generally incurs very costly regression testing to ensure that these real time systems are not affected.

One embodiment of the present invention provides a solution to this problem by one or more minor frame substitutions 42 that may momentarily replace an existing minor frame 41. These minor frame substitutions may be used to accomplish a particular task that may occur on an irregular basis such as providing instantaneous information in the form of video, or other tactically intensive information to the operator that may be pertinent to any one particular scenario or that may be encountered during operation of the vehicle. This type of informational model is more consistent with practical operating scenarios where the operator of the vehicle may need or desire instantaneous information in an aperiodic fashion in order to make an intelligent response to any potentially unforeseeable scenario.

FIG. 5 shows one embodiment incorporating minor frame substitutions having four major frames (40a, 40b, 40, and 40d) that are sequentially transmitted over the vehicular control databus in time-wise fashion from left to right. Each major frame has a predetermined quantity of minor frames 41, which are aligned with each other, according to a strict, periodic sequence. For example, the first minor frame within the major frame structure will be transmitted first, and so on until minor frames 41 have been transmitted over the databus 17. In one embodiment, the vehicular databus is a MIL-STD-1553 databus such that each minor frame 41 may contain one or more messages according to its definitive protocol standards. Additionally, each minor frame 41 is generally adapted to accomplish one predetermined task encountering communication with one or more peripheral devices 14.

Major frames 40b, and 40c are similar to major frames 40a, and 40d except that the first minor frame 41a has been substituted by a substitute minor frame 42. Although the pictorial example shown, depicts two major frames (40b, and 40c) having minor frame substitutions, there may in fact be as few as one or many major frames 40 having minor frame substitutions that occur sequentially. The maximum limit of sequential major frames 40 having minor frame substations being the ability of the first minor frame 41a (the minor frame being replaced) to be able to accomplish its intended purpose without significant degradation of performance. Moreover, the embodiment shown has only one minor frame 41 within each major frame 40 that has been substituted. However, none, one, or more minor frames 41 may be substituted within each major frame 40. The upper quantity of minor frame substitutions within each major frame 40 may have the ability of the control databus system to function without significant degradation in performance.

Figure 6:
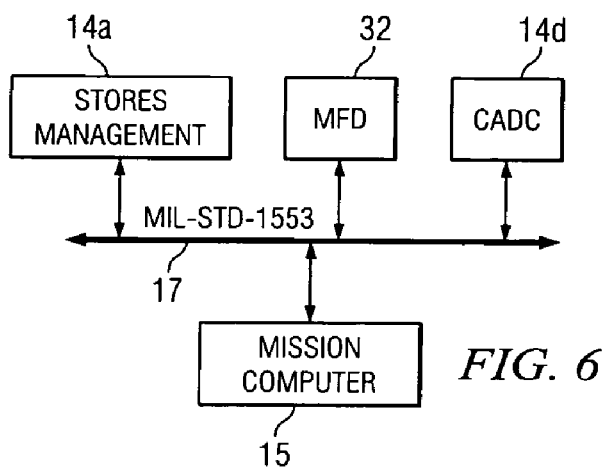
FIG. 6 is a diagrammatic view of a multi function display (MFD) that has been implemented according to the embodiment of FIG. 1.

FIG. 6 depicts one embodiment of the present invention in which an information layer has been coupled to a vehicular control databus 17 such as a MIL-STD-1553 databus using the multi function display 32 of FIGS. 3, and 4. The multi function display 32 is advantageous due to its integration into the information layer interface 10; however, other peripheral devices 14 may also be implemented by making use of the teachings of the this disclosure. Additionally, the present embodiment is directed to a vehicular control databus 17 incorporating the MIL-STD-1553 protocol; however, the teachings of the present invention may be applied to any vehicular control databus 12 having a suitable protocol. As shown, a mission computer 15 is coupled to peripheral devices defined by a central air data computer 14d and a multi function display 32 via a MIL-STD-1553 databus 17. Other peripheral devices 14 may be coupled to the databus, however only the mission computer 15, central air data computer 14d, and multi function display 32 are shown for brevity and clarity of description.

During normal operation, the multi function display 32 is coupled to the databus 17 as a bus monitor (BM). The multi function display 32 operating in bus monitor mode only reads data from the databus and therefore existing performance and functionality of the existing vehicular control system remains substantially unaffected. While in the bus monitor mode, the multi function display 32 may have access to all information that is transmitted over the databus. Application programs resident on the multi function display 32 may accumulate all of this available information for presentation to the operator in an easily accessible form. Examples may include the display of radar or other types of imagery, and status summaries regarding the health of mission critical control systems on the vehicle to name a few.

One embodiment of the present invention provides the capability for the multi function display 32 to also assume control over one or more peripheral devices 14 that may be coupled to the vehicular control databus 17. This may be accomplished by converting the multi function display 32 from operation as a bus monitor (BM) to operation as a remote terminal (RT). Operation of a peripheral device 14 on the MIL-STD-1553 databus as a remote terminal allows the peripheral device 14 to transmit and receive control messages to and from respectively, the mission computer. This functionality allows the multi function display 32 that is configured in remote terminal mode to control various other peripheral devices 14 coupled to the MIL-STD-1553 databus.

Figure 7:
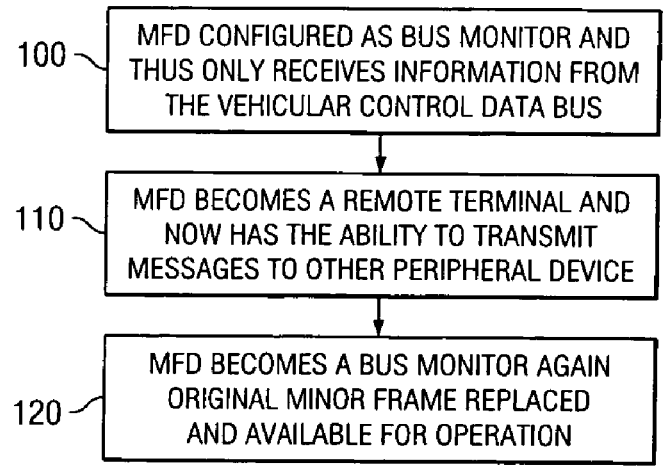
FIG. 7 is a flow diagram of another embodiment according to the present invention that show one process of allowing a peripheral device to gain momentary access to the vehicular control databus.

FIG. 7 shows a method of acts that may be utilized by the multi function display 32, which is configured according to FIG. 6, to control other peripheral devices 14, such as a stores management system 14a coupled to the vehicular control databus 17. In act 100, the multi function display 32 is configured as a bus monitor and thus only receives information that is being transmitted from other peripheral devices 14 coupled to the databus 17. Within this act, application programs 25 resident on the multi function display 32 may access data from at least one control network coupled peripheral device 14 and present this data to the operator of the vehicle on its associated display in easily readable form. A particular application program 25 may be operable to access data from multiple peripheral devices 14 and combine this data on the display for simultaneous view by the operator. The operator may also be able to switch between alternative views of the various multiple peripheral devices 14 under manual control. In this mode, central air data computer 14d may be configured as a remote terminal (RT) and has the first minor frame 41a delegated thereto in which to transmit and receive data pertinent to its proper operation. Major Frames 40a, and 40d of FIG. 5 depict a first minor frame 41a that has been delegated for control and receipt of data from central air data computer 14d. It is important to note that the multi function display 32, as a bus monitor, may read this first minor frame 41a in order to access all information emanating from the central air data computer 14d, but may not offer any control thereover.

To access control over one or more control network coupled peripheral devices 14, the operator may issue a request to convert the multi function display 32 from bus monitor mode to the remote terminal mode (act 110). This request may be a dedicated button or switch located on the user interface 28, or may be automatically actuated by the one or more application programs (25 or 26) resident on the multi function display 32 or mission controller 15 respectively. This automatically actuated request may be issued by a particular application program (25 or 26) due to any predetermined sequence or combination of events. In response to a valid actuation by the operator or pertinent application program (25 or 26), one or more minor frames 41 may be substituted on the vehicular control databus 17 in order to allow the control over at least one of the plurality of peripheral devices 14 to take place. In the particular example as shown in FIGS. 5, and 6, the multi function display 32 is operable to gain access to the vehicular control databus 17 as a remote terminal by the substitution of minor frames 41*a* originally delegated to the central air data computer 14*d* as shown in the major frames 40*b* and 40*c*. Thus, the multi function display 32 may take momentary control over a peripheral device 14 by converting to the remote terminal mode, coupled with a vehicular control databus 17 that is operable to cause minor frame substitutions of one or more existing minor frames 41. In the present embodiment, the multi function display 32 may assume control over other peripheral devices 14 on the databus 17 for a momentary period of time with insignificant effect upon the existing operability of vehicular control network 12.

In order to enable the minor frame substitution to take place, application software resident on the mission controller 15 of an existing vehicular control network may be modified to become responsive to a dedicated switch or specific keypress sequence of the user interface 28 in order to initiate the minor frame substitution method. This is a generally "one time" modification, whereby further enhancements to the information layer 10 may not necessitate further modification of the mission controller 15. Following the modification of the mission controller 15 to provide for minor frame substitutions 42, a plurality of enhancements may be allowed on the information layer 10 with little or no modification required to the vehicular control layer 12.

While the above embodiment employs the multi function display 32 in remote terminal mode, central air data computer 14*d* is momentarily un-coupled from the system. Therefore, communication with the central air data computer 14*d* is not allowed for a short duration of time. Nevertheless, this mode of operation may not necessarily hamper the performance of the vehicular control system 12 due to the fact that the operator has requested a specific momentary operation, which does not involve the functionality of the central air data computer 14*d*. Following completion of the momentary task, the multi function display 32 may again be converted to bus monitor mode and the first minor frame 41*a* again allotted to communication with central air data computer 14*d* (act 120). Major frame 41*d* depicts a first minor frame which is delegated to communication and control of central air data computer 14*d*, in a similar manner as had existed prior to the frame substitution of major frame 41*a*.

Although an embodiment of the invention has been described using specific terms, such description is for illustrative purposes only. It is to be understood that changes and variations may be made by those of ordinary skill in the art without departing from the spirit or scope of the present invention, which is set forth in the following claims. Therefore, the spirit and scope of the appended claims should not be limited to the description of the embodiments disclosed therein.

What is claimed is:

1. An avionics control system comprising:
   a control network that is operable to administer the operation of at least one avionics peripheral device via a MIL-STD-1553 bus;
   an extensible layer that is operable to administer the operation of at least one user display function, the extensible layer comprising an internet protocol (IP) data network, wherein the at least one user display function being accessible by an operator of the vehicle during the operation thereof; and
   a MIL-STD-1553 to IP conversion circuit operable to facilitate communication of the user display with the at least one avionics peripheral device.

2. The avionics control system of claim 1, further comprising a control system to facilitate control over the at least one avionics peripheral device via the at least one user display.

3. A control system for a vehicular network comprising:
   a control network that is operable to administer the operation of at least one peripheral device associated with the operation of a vehicle via a vehicular control databus, the at least one peripheral device being disposed on the vehicle;
   an extensible layer that is operable to administer the operation of at least one user interface application, the extensible layer having a protocol that is disparate to the control network; and
   an interfacing circuitry operable to facilitate communication of the user interface application with the at least one peripheral device.

4. The information layer for a vehicular network of claim 3, wherein the at least one user interface application is accessible by an operator of the vehicle during the operation thereof.

5. The information layer for a vehicular network of claim 3, wherein the vehicular control system comprises an aircraft vehicular control system.

6. The information layer for a vehicular network of claim 3, wherein the at least one peripheral device is selected from the group consisting of a radar, an antenna, a data link, an early warning sensor, a targeting pod, and a forward looking infrared radar.

7. The information layer for a vehicular network of claim 3, wherein the vehicular control bus comprises a MIL-STD-1553 bus.

8. The information layer for a vehicular network of claim 3, wherein the at least one user interface application communicates with the extensible layer via a data network.

9. The information layer for a vehicular network of claim 8, wherein the data network comprises an internet protocol (IP) data network.

10. The information layer for a vehicular network of claim 3, wherein the user interface application communicates with the extensible layer via extensible markup language (XML) and a relational database.

11. The information layer for a vehicular network of claim 3, wherein the user interface application is operable to administer the operation of at least one external peripheral device via the extensible layer, wherein the at least one external peripheral device is not disposed on the vehicle.

12. A method comprising:
   providing vehicular control databus that is operable to administer the operation of at least one peripheral device associated with the operation of a vehicle;
   providing an extensible data network that is operable to administer the operation of at least one software application, the extensible data network having a protocol that is disparate to the vehicular control databus;
   monitoring a first signal that has been transmitted from the at least one peripheral device;
   converting the first signal from a protocol that is compliant to the vehicular control databus to a second signal having a protocol that is compliant to the extensible data network; and sending the second signal to the at least one software application during operation of the vehicle, the software application being operable to provide information regarding the operation of the vehicle to an operator of the vehicle.

13. The method of claim 12, wherein the vehicular control databus is a MIL-STD-1553 bus.

14. The method of claim 12, wherein the extensible data network is an Ethernet protocol.

15. The method of claim 12, further comprising:
transmitting a third signal by the software application;
converting the third signal from a protocol that is compliant to the extensible data network to a fourth signal having a protocol that is compliant to the vehicular control databus; and
sending the second signal to the at least one peripheral device via the vehicular control databus.

16. The method of claim 12, wherein:
the vehicular control databus has major frames of fixed duration that are sub-divided into a plurality of minor frames;
the extensible data network is coupled to the vehicular control databus and is not initially configured to transmit signals over the vehicular control databus; and
substituting at least one of the plurality of minor frames during operation of the vehicular control databus with at least one substituted minor frame such that the at least one software application may transmit signals over the vehicular control databus via the at least one substituted minor frame.

17. The method of claim 16, further comprising:
the at least one peripheral device being associated with at least one particular minor frame of the plurality of minor frames; and
logically removing the at least one peripheral device from the at least one particular minor frame prior to the substituting at least one of the plurality of minor frames, such that the at least one peripheral device momentarily may not access the vehicular control databus.

18. The method of claim 12, wherein the vehicular control databus is configured on a military vehicle.

19. The method of claim 18, wherein the military vehicle is an aircraft.

20. The method of claim 19, wherein the vehicular control databus is a MIL-STD-1553 databus.

* * * * *